United States Patent
Saito et al.

(10) Patent No.: US 11,919,459 B2
(45) Date of Patent: Mar. 5, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/993,254

(22) Filed: Nov. 23, 2022

(65) Prior Publication Data

US 2023/0174004 A1 Jun. 8, 2023

(30) Foreign Application Priority Data

Dec. 3, 2021 (JP) .................. 2021-197054

(51) Int. Cl.
*B60R 16/02* (2006.01)
*H02G 3/04* (2006.01)
*H02G 3/32* (2006.01)
*H01B 7/40* (2006.01)

(52) U.S. Cl.
CPC ....... *B60R 16/0215* (2013.01); *H02G 3/0468* (2013.01); *H02G 3/32* (2013.01); *H01B 7/40* (2013.01)

(58) Field of Classification Search
CPC .. H02G 3/04; H02G 3/30; H02G 3/32; H02G 3/40; H02G 3/0418; H02G 3/0462; H02G 3/0481; B60R 16/0207; B60R 16/0215; H01B 7/0045
See application file for complete search history.

(56) References Cited

U.S. PATENT DOCUMENTS

| | | | |
|---|---|---|---|
| 6,110,172 A * | 8/2000 | Jackson | A61B 17/7032 606/305 |
| 7,740,211 B2 * | 6/2010 | Dukes | H02G 1/08 248/74.1 |
| 2019/0089142 A1 | 3/2019 | Sugino | |
| 2020/0274343 A1 | 8/2020 | Sugino | |

FOREIGN PATENT DOCUMENTS

| | | | |
|---|---|---|---|
| JP | 2009038899 A * | 2/2009 | ............... H02G 3/30 |
| JP | 2019-053894 A | 4/2019 | |

* cited by examiner

*Primary Examiner* — Paresh Paghadal
(74) *Attorney, Agent, or Firm* — Oliff PLC

(57) ABSTRACT

A wire harness including: a wire harness main body that includes an electric wire, an exterior tube that covers an outer circumferential surface of the electric wire, and a first path restrictor that is attached to an outer circumferential surface of the exterior tube and is configured to restrict a path of the exterior tube; and an attachment that is attached to an outer circumferential surface of a portion of the first path restrictor in a lengthwise direction thereof.

9 Claims, 8 Drawing Sheets

WIRE HARNESS

BACKGROUND

The present disclosure relates to a wire harness.

Conventionally, as a wire harness for a vehicle, there has been a wire harness that includes: an electric wire member; an exterior member that covers the electric wire member; and a path restricting member that is attached to an outer circumferential surface of the exterior member and is configured to restrict the path of the exterior member (for example, see JP 2019-53894A).

SUMMARY

In the above-described wire harness, the path restricting member may be attached to an attaching member such as another path restricting member, and in such a case, it is desirable that an attaching portion between the path restricting member and the attaching member does not rattle. Note that rattling of the attaching portion may cause damage to the attaching portion due to vibration, for example.

An exemplary aspect of the disclosure provides a wire harness that is capable of suppressing rattling.

A wire harness according to the present disclosure includes: a wire harness main body that includes an electric wire, an exterior tube that covers an outer circumferential surface of the electric wire, and a first path restrictor that is attached to an outer circumferential surface of the exterior tube and is configured to restrict a path of the exterior tube; and an attachment that is attached to an outer circumferential surface of a portion of the first path restrictor in a lengthwise direction thereof, wherein: the first path restrictor is provided with an insertion port that is open in a direction orthogonal to the lengthwise direction of the first path restrictor, and extends over an entirety of the first path restrictor in the lengthwise direction thereof, the attachment includes a cover that covers the outer circumferential surface of the first path restrictor, and a press that is attached to the cover, the cover is provided with a fixing hole that penetrates through the cover from an outer circumferential surface side to an inner circumferential surface side thereof, the press is provided with a fixed portion that is fixed in the fixing hole, and a protrusion that protrudes from the fixed portion toward an inner circumferential surface of the cover, and the protrusion is configured to come into contact with the wire harness main body and press the wire harness main body against the inner circumferential surface of the cover.

The wire harness according to the present disclosure achieves the effect of suppressing rattling.

DETAILED DESCRIPTION OF EMBODIMENTS

Description of Embodiments of Present Disclosure

Figure 1:
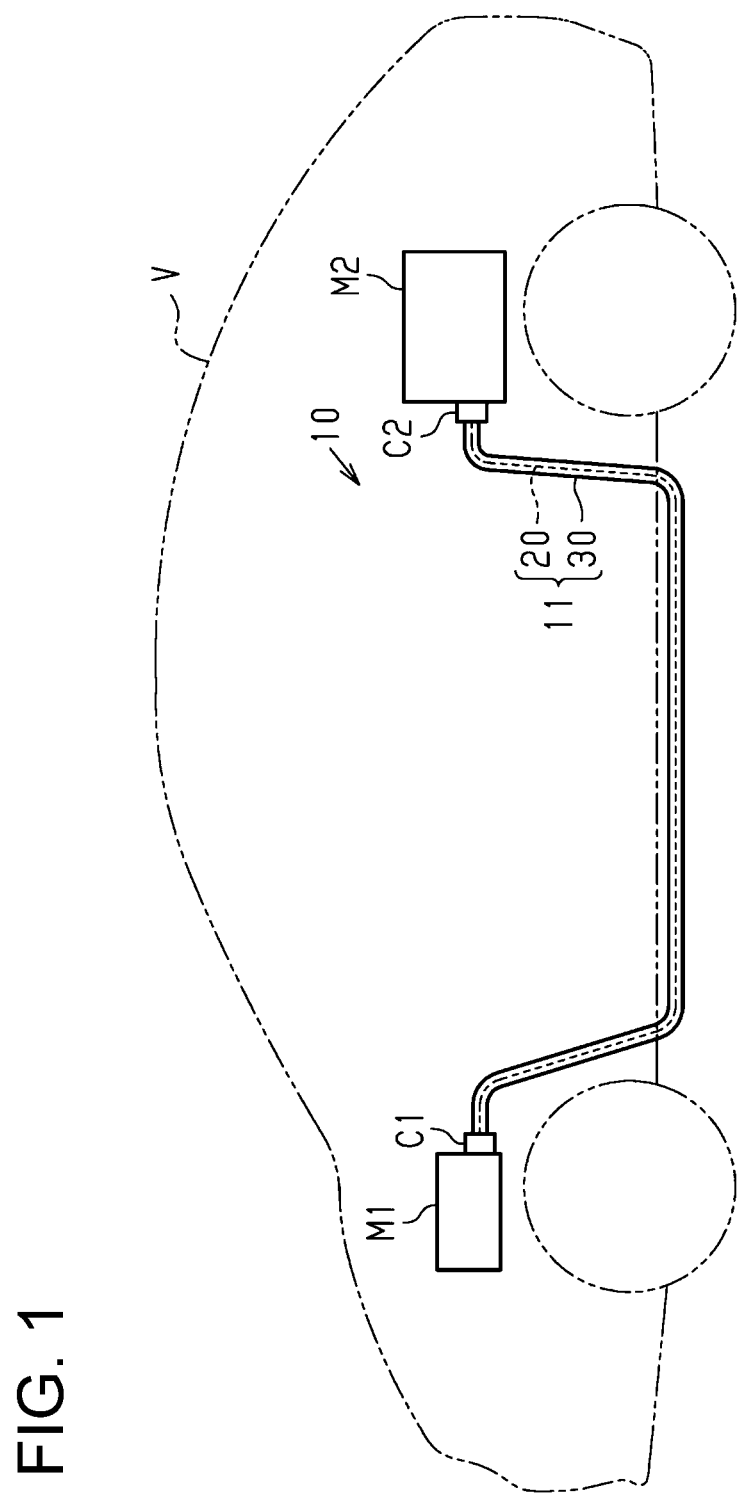
FIG. 1 is a schematic configuration diagram showing a wire harness according to an embodiment.

First, embodiments of the present disclosure will be listed and described.

A wire harness according to the present disclosure is

[1] a wire harness including: a wire harness main body that includes an electric wire member, an exterior member that covers an outer circumferential surface of the electric wire member, and a first path restricting member that is attached to an outer circumferential surface of the exterior member and is configured to restrict a path of the exterior member; and an attaching member that is attached to an outer circumferential surface of a portion of the first path restricting member in a lengthwise direction thereof, wherein the first path restricting member is provided with an insertion port that is open in a direction orthogonal to the lengthwise direction of the first path restricting member, and extends over an entirety of the first path restricting member in the lengthwise direction thereof, the attaching member includes a covering portion that covers an outer circumferential surface of the first path restricting member, and a pressing member that is attached to the covering portion, the covering portion is provided with a fixing hole that penetrates through the covering portion from an outer circumferential surface side to an inner circumferential surface side thereof, the pressing member is provided with a fixed portion that is fixed in the fixing hole, and a protruding portion that protrudes from the fixed portion toward an inner circumferential surface of the covering portion, and the protruding portion is configured to come into contact with the wire harness main body and press the wire harness main body against the inner circumferential surface of the covering portion.

With this configuration, the wire harness main body that extends inside the covering portion is pressed by the pressing member fixed to the fixing hole of the covering portion, against the inner circumferential surface of the covering portion. As a result, the covering portion and the wire harness main body can be prevented from rattling.

[2] The protruding portion is inserted into the insertion port, and the protruding portion is in contact with the outer circumferential surface of the exterior member to press the exterior member.

With this configuration, the protruding portion that is in contact with the exterior member can press the exterior member and the first path restricting member against the inner circumferential surface of the covering portion. Also, the protruding portion is inserted into the insertion port of the first path restricting member, and therefore two end portions of the first path restricting member in the circumferential direction thereof, which define the insertion port, can engage with the protruding portion of the pressing member in the circumferential direction thereof. Therefore, it is possible to prevent the first path restricting member from rotating in the circumferential direction thereof, using the protruding portion.

[3] The protruding portion is in contact with the outer circumferential surface of the first path restricting member to press the first path restricting member.

With this configuration, the protruding portion that is in contact with the first path restricting member can press the first path restricting member against the inner circumferential surface of the covering portion.

[4] The pressing member is a screw that is provided with an external thread portion that is screwed into the fixing hole, and a portion of the external thread portion constitutes the protruding portion.

With this configuration, it is possible to realize a pressing member that presses the wire harness main body, by performing a simple operation to screw the screw into the fixing hole until the leading end of the external thread portion abuts against the wire harness main body.

[5] The fixed portion is press-fitted into the fixing hole and is fixed thereto.

With this configuration, it is possible to realize a pressing member that presses the wire harness main body, by performing a simple operation to press-fit the fixed portion of the pressing member into the fixing hole.

[6] The fixing hole is provided as a plurality fixing holes, the pressing member is attached to at least one fixing hole of the plurality of fixing holes, and at least one fixing hole of the plurality of fixing holes is an open fixing hole to which the pressing member is not attached and that is in an open state.

With this configuration, the fixing hole to which the pressing member is to be attached can be selected from among a plurality of fixing holes. As a result, flexibility in attaching the pressing member is improved. Also, water that has entered between the covering portion and the wire harness main body can be discharged to the outside of the covering portion through the open fixing hole.

[7] The attaching member includes a main body portion that is configured to restrict the path of the exterior member, a receiving portion that is provided at an end portion of the main body portion in a lengthwise direction of the wire harness main body, and a lid portion that covers an entirety of the first path restricting member in a circumferential direction thereof, together with the receiving portion, and the receiving portion and the lid portion constitute the covering portion. With this configuration, the covering portion that covers the outer circumferential surface of the first path restricting member can be constituted by the receiving portion and the lid portion.

[8] The fixing hole is provided in the lid portion.

With this configuration, the pressing member can be attached to the fixing hole provided in the lid portion.

[9] The attaching member is a second path restricting member that is attached to the outer circumferential surface of the exterior member and is configured to restrict the path of the exterior member, and the covering portion is provided at an end portion of the second path restricting member in a lengthwise direction thereof, and covers an outer circumferential surface of an end portion of the first path restricting member in the lengthwise direction thereof.

With this configuration, the covering portion is provided at an end portion of the second path restricting member in a lengthwise direction thereof, and covers an outer circumferential surface of an end portion of the first path restricting member in the lengthwise direction thereof. Therefore, the first path restricting member and the second path restricting member are coupled to each other in the lengthwise direction thereof. Therefore, the path of the exterior member is continuously restricted by the first path restricting member and the second path restricting member.

[10] The first path restricting member is configured to restrict a path of a straight section that is included in the path of the wire harness main body, and the second path restricting member is configured to restrict a path of a bent section that is included in the path of the wire harness main body.

With this configuration, the path of the straight section is restricted by the first path restricting member, and the path of the bent section is restricted by the second path restricting member. As a result, the path of the straight section and the path of the bent section of the wire harness are continuously restricted from deviating from the respective desired paths thereof.

Details of Embodiments of Present Disclosure

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The term "orthogonal" in the present specification is not limited to being strictly orthogonal, but may be substantially orthogonal within the range in which the actions and effects of the embodiments can be exhibited.

Also, "(to) face" in the present specification means that surfaces or members are located right in front of each other, and refers to not only cases in which the entirety of the surfaces or members are located right in front of each other, but also cases in which portions of the surfaces or members are located right in front of each other. Also, "(to) face" in the present specification means both a case in which a member different from two portions is interposed between the two portions and a case in which nothing is interposed between the two portions.

Also, the term "annular" used in descriptions included in the present specification may refer to any structure that provides a loop, a continuous shape with no ends, and a typical loop shape with a C-shaped gap. Note that examples of an "annular" shape include, but are not limited to, a circular shape, an ellipsoidal shape, and a polygonal shape with sharp or rounded corners.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that covers the outer circumferential surface of the electric wire member 20. In addition, the wire harness main body 11 is provided with a first path restricting member 40 (first path restrictor) that is attached to the outer circumferential surface of the exterior member 30 and is configured to restrict the path of the exterior member 30 (see FIG. 2). The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
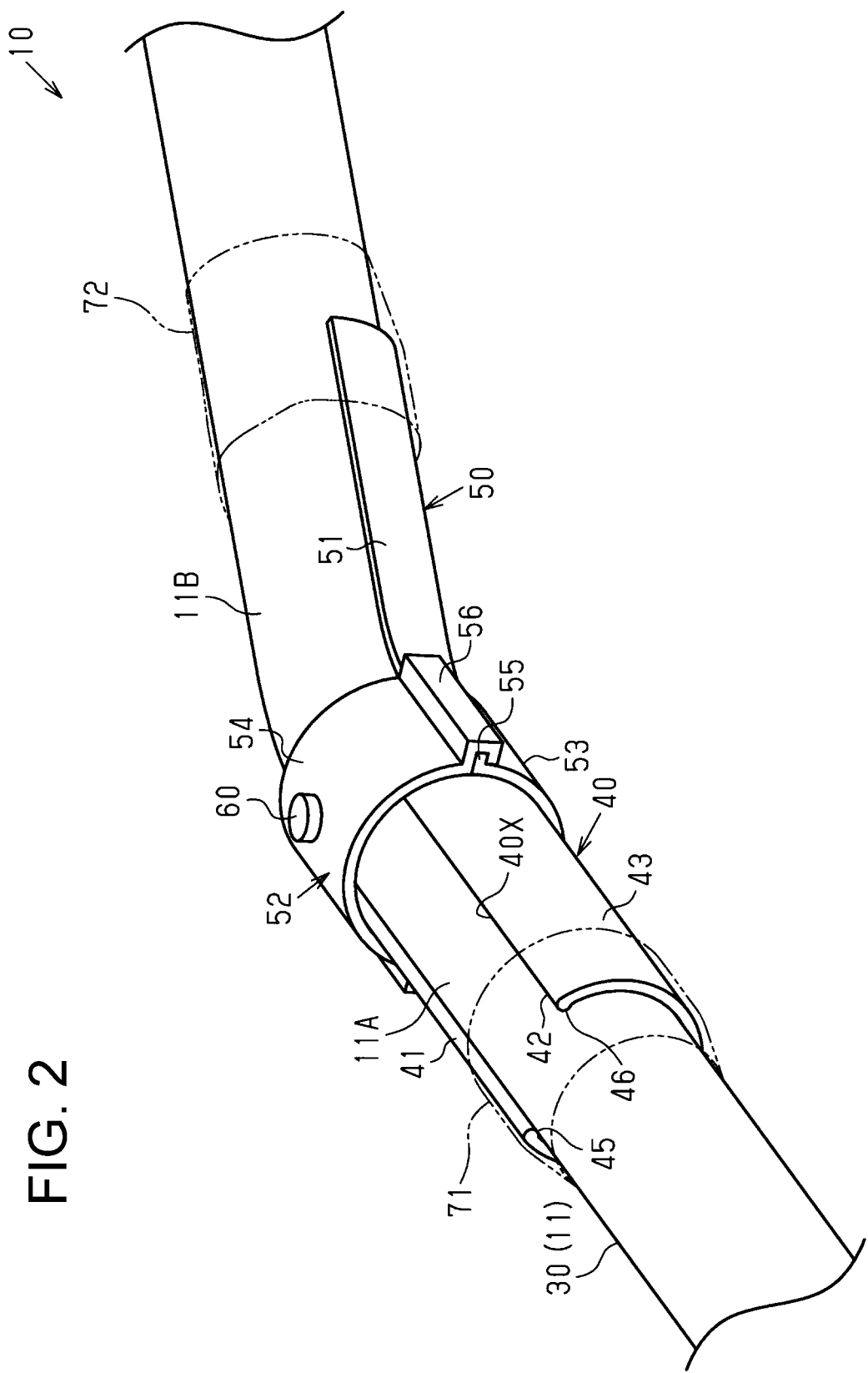
FIG. 2 is a schematic perspective view showing the wire harness according to the embodiment.

As shown in FIG. 2, the wire harness 10 is provided with a second path restricting member 50 (second path restrictor) that is attached to the outer circumferential surface of the exterior member 30. The first path restricting member 40 and the second path restricting member 50 restrict the path along which the wire harness main body 11 is routed. Note that the first path restricting member 40 and the second path restricting member 50 are omitted from FIG. 1.

Configuration of Electric Wire Member 20

Figure 3:
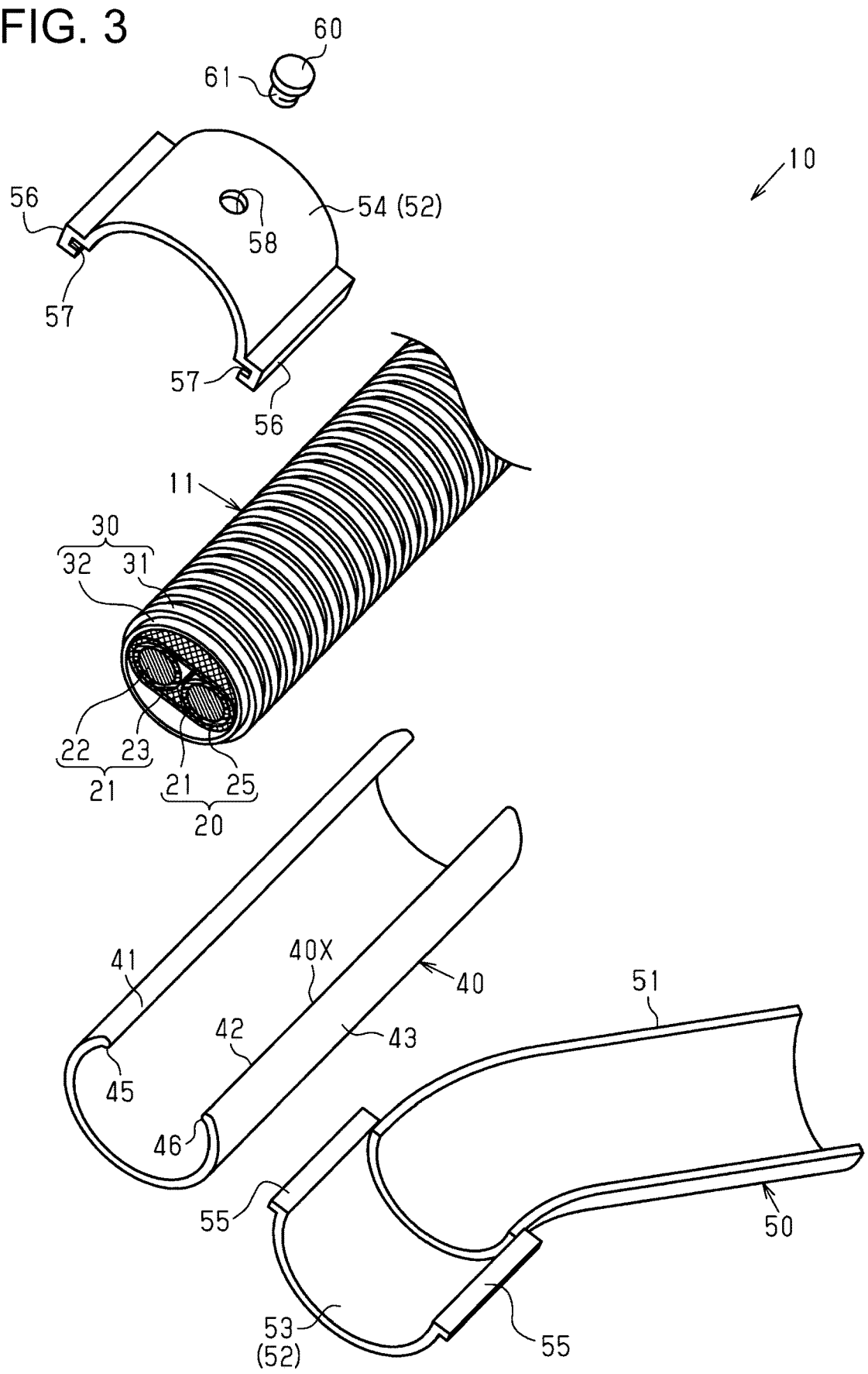
FIG. 3 is a schematic exploded perspective view showing the wire harness according to the embodiment.
Figure 4:
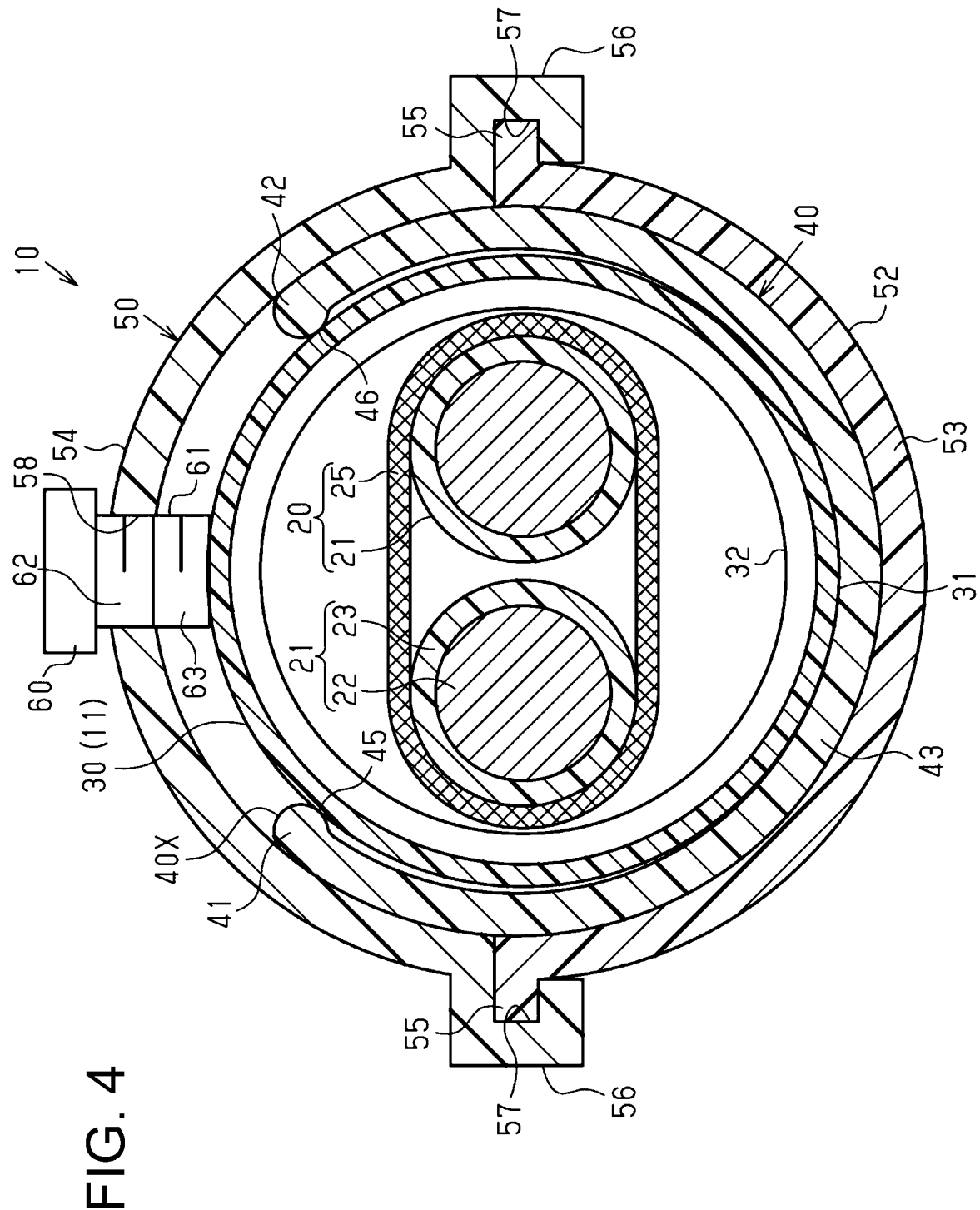
FIG. 4 is a schematic horizontal cross-sectional view showing the wire harness according to the embodiment.

As shown in FIGS. 3 and 4, for example, the electric wire member 20 includes one or more electric wires 21, specifically two electric wires 21 in the present embodiment, and a braided member 25 that collectively encloses the outer circumferential surfaces of the plurality of electric wires 21.

Each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each electric wire 21 cut along a plane that is orthogonal to the lengthwise direction of each electric wire 21, i.e., the horizontal cross-sectional shape of each electric wire 21, may be any shape. The horizontal cross-sectional shape of each electric wire 21 may be, for example, a circular shape, a semicircular shape, a polygonal shape, a square shape, a flat shape, or the like. The horizontal cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

The exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30, for example, seals the inside of the exterior member 30 all the way around the circumferential surface thereof. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover. The exterior member 30 in the present embodiment is a resin corrugated tube that has a bellowed shape in which the diameter repeatedly increases and decreases in the lengthwise direction of the exterior member 30. That is to say, the exterior member 30 in the present embodiment has a bellowed structure in which large-diameter portions 31 and small-diameter portions 32 that have a smaller diameter than the large-diameter portions 31 are alternately provided in the lengthwise direction of the exterior member 30. The large-diameter portions 31 and the small-diameter portions 32 each have an annular shape that extends around the exterior member 30 in the circumferential direction thereof, for example. As the material of the exterior member 30, a synthetic resin such as polyolefin, polyamide, polyester, or an ABS resin may be used, for example. Note that, in FIG. 2, the exterior member 30 is simplified in order to simplify the drawing.

Configurations of First Path Restricting Member 40 and Second Path Restricting Member 50

As shown in FIGS. 2 and 3, the first path restricting member 40 and the second path restricting member 50 each hold the exterior member 30. The first path restricting member 40 and the second path restricting member 50 are each more rigid than the exterior member 30, for example. Compared to the exterior member 30, the first path restricting member 40 and the second path restricting member 50 are each more rigid so as to be less bendable in a direction orthogonal to the lengthwise direction of the wire harness main body 11. With this configuration, the first path restricting member 40 and the second path restricting member 50 each restrict the path of the wire harness main body 11. For example, the first path restricting member 40 and the second path restricting member 50 each assist the exterior member 30 so that the wire harness main body 11 does not bend under its own weight or the like and does not deviate from a desired path.

As shown in FIG. 2, the first path restricting member 40 is provided along a portion of the wire harness main body 11 in the lengthwise direction thereof. For example, the first path restricting member 40 is attached to the outer circumferential surface of the exterior member 30 along a straight section 11A, which is a straight section of the path of the wire harness main body 11. The first path restricting member 40 is configured to restrict the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 50 is provided along a portion of the wire harness main body 11 in the lengthwise direction thereof. For example, the second path restricting member 50 is attached to the outer circumferential surface of the exterior member 30 along a bent section 11B, which is a bent section of the path of the wire harness main body 11. The second path restricting member 50 is configured to restrict the path of the wire harness main body 11 in the bent section 11B. Here, the bent section 11B is a section in which the path of the wire harness main body 11 is bent so as to deviate from a straight line. Note that one or more second path restricting members 50 may be provided depending on the path of the wire harness main body 11.

Configuration of First Path Restricting Member 40

As shown in FIGS. 2 and 4, the first path restricting member 40 covers a portion of the outer circumferential surface of the exterior member 30 in the circumferential direction of the exterior member 30. The first path restricting member 40 has a shape that covers a portion of the outer circumferential surface of the exterior member 30 in the circumferential direction thereof. The first path restricting member 40 has a C-like horizontal cross-sectional shape as a whole. For example, the first path restricting member 40 covers a range larger than half of the outer circumferential surface of the exterior member 30. That is to say, the first path restricting member 40 covers a range larger than half of the outer circumferential of the exterior member 30 in the circumferential direction of the exterior member 30.

As shown in FIG. 2, the first path restricting member 40 extends along the straight section 11A in the lengthwise direction of the exterior member 30. For example, the first path restricting member 40 is formed in a shape that extends straight in one direction. For example, the horizontal cross-sectional shape of the first path restricting member 40 is uniform over the entirety of the first path restricting member 40 in the lengthwise direction thereof.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using a well-known manufacturing method such as extrusion molding or injection molding, for example. In the present embodiment, the first path restricting member 40 is an extrusion-molded part manufactured through extrusion molding. Therefore, it is easy to manufacture the first path restricting member 40 by using an extrusion molding machine that extrudes the raw material of the first path restricting member 40 in the lengthwise direction thereof. Also, it is possible to manufacture a plurality of types of first path restricting members 40 with different sizes in the lengthwise direction thereof by using a single extrusion molding machine. For example, it is possible to manufacture a plurality of types of first path restricting members 40 with different sizes in the lengthwise direction thereof by cutting the base material of the first path restricting member 40 formed using a single extrusion molding machine, at any desired length, using a cutting machine.

As shown in FIGS. 3 and 4, the first path restricting member 40 is provided with an insertion port 40X that is open in a direction orthogonal to the lengthwise direction of the first path restricting member 40. The insertion port 40X extends over the entirety of the first path restricting member 40 in the lengthwise direction thereof. The first path restricting member 40 includes a first end portion 41 and a second end portion 42 that are two end portions of the first path restricting member 40 in the circumferential direction thereof and define the insertion port 40X. The first path restricting member 40 includes a coupling portion 43 that couples the first end portion 41 and the second end portion 42 to each other. In other words, the first path restricting member 40 includes a coupling portion 43 that is formed so as to cover a portion of the exterior member 30 in the circumferential direction thereof, the first end portion 41 and the second end portion 42 that are provided at two end portions of the coupling portion 43, and the insertion port 40X that is defined by the first end portion 41 and the second end portion 42.

The coupling portion 43 constitutes a main portion of the first path restricting member 40. The thickness of the coupling portion 43 in a radial direction is uniform in the circumferential direction of the first path restricting member 40, for example. The horizontal cross-sectional shape of the coupling portion 43 is a shape that matches the outer surface of the exterior member 30. For example, the first end portion 41, the second end portion 42, and the coupling portion 43 each have an arc-like horizontal cross-sectional shape.

The first end portion 41 and the second end portion 42 are provided opposite to each other in the circumferential direction of the first path restricting member 40. The first end portion 41 and the second end portion 42 are separated from each other in the circumferential direction of the first path restricting member 40 with the insertion port 40X being interposed therebetween. In other words, the gap between the first end portion 41 and the second end portion 42 in the circumferential direction of the first path restricting member 40 is provided as the insertion port 40X. As described above, the first path restricting member 40 is formed in a C shape in which the insertion port 40X is provided at a portion of the first path restricting member 40 in the circumferential direction thereof.

The respective leading ends of the first end portion 41 and the second end portion 42 each have a curved horizontal cross-sectional shape. The respective leading ends of the first end portion 41 and the second end portion 42 in the present embodiment each have a circular arc horizontal cross-sectional shape.

The first path restricting member 40 includes a protruding portion 45 (protrusion) that protrudes from the inner surface of the first end portion 41, and a protruding portion 46 that protrudes from the inner surface of the second end portion 42. The protruding portions 45 and 46 each protrude toward the exterior member 30 inserted into the first path restricting member 40, and come into contact with the outer surface of the exterior member 30. The protruding portions 45 and 46 each come into contact with the outer surfaces of the large-diameter portions 31 of the exterior member 30. For example, the protruding portion 45 protrudes from the inner surface of the leading end of the first end portion 41. For example, the protruding portion 46 protrudes from the inner surface of the leading end of the second end portion 42. For example, the protruding portions 45 and 46 each have a curved horizontal cross-sectional shape. The protruding portions 45 and 46 in the present embodiment each have a circular arc horizontal cross-sectional shape. The protruding portions 45 and 46 extend in the lengthwise direction of the first path restricting member 40. For example, the protruding portions 45 and 46 each extend over the full length of the first path restricting member 40 in the lengthwise direction thereof.

The protruding portions 45 and 46 each press the exterior member 30 from the outside of the exterior member 30. The exterior member 30 is elastically held by the protruding portion 45, the protruding portion 46, and the coupling portion 43. As a result, the first path restricting member 40 is firmly coupled to the exterior member 30.

As shown in FIG. 4, the opening width of the insertion port 40X, i.e., the shortest distance between the first end portion 41 and the second end portion 42, is smaller than the outer diameter of the exterior member 30.

The opening width of the insertion port 40X increases as a result of the first path restricting member 40 elastically deforming. For example, the opening width of the insertion port 40X increases as a result of the exterior member 30 being inserted into the insertion port 40X in a direction orthogonal to the lengthwise direction of the first path restricting member 40. When the exterior member 30 is inserted into the first path restricting member 40, the first path restricting member 40 elastically deforms to return to the original shape thereof. As a result, the opening width of the insertion port 40X becomes smaller than the outer diameter of the exterior member 30, and the first path restricting member 40 is attached to the outer circumferential surface of the exterior member 30.

Configuration of Second Path Restricting Member 50

As shown in FIG. 2, the second path restricting member 50 is attached to the outer circumferential surface of the exterior member 30 in the bent section 11B. The second path restricting member 50 extends in the lengthwise direction of the exterior member 30 in the bent section 11B. The second path restricting member 50 is bent along the shape of the bent section 11B, for example.

The second path restricting member 50 is made of metal or resin, for example. The second path restricting member 50 in the present embodiment is made of resin. As the material of the second path restricting member 50, a synthetic resin such as polypropylene, polyamide, or polyacetal may be used, for example. The second path restricting member 50 may be manufactured using a well-known manufacturing method such as injection molding, for example.

As shown in FIGS. 2, 3, and 4, the second path restricting member 50 includes a main body portion 51 (main body) and a covering portion 52 (cover) that covers an end portion of the first path restricting member 40 in the lengthwise direction thereof.

The main body portion 51 is, for example, formed in an elongated shape that extends in the lengthwise direction of the exterior member 30 in the bent section 11B. The main body portion 51 is, for example, bent along the shape of the bent section 11B. That is to say, the main body portion 51 has a bent shape that is bent along the shape of the bent section 11B. The main body portion 51 covers a portion of the outer circumferential surface of the exterior member 30 in the circumferential direction of the exterior member 30. The main body portion 51 covers, for example, approximately half of the outer circumference of the exterior member 30. For example, the main body portion 51 covers a range of approximately 180° of the outer circumferential surface of the exterior member 30. For example, the main body portion 51 has a substantially semi-cylindrical shape.

The covering portion 52 is provided on an end portion of the main body portion 51 in the lengthwise direction thereof. An end portion of the main body portion 51 in the lengthwise direction thereof is provided with a receiving portion 53 (receiver) that is formed integrally with the end portion, and a lid portion 54 (lid) that covers the receiving portion 53.

The receiving portion 53 covers a portion of the outer circumferential surface of the first path restricting member 40 in the circumferential direction of the first path restricting member 40. The receiving portion 53 covers a portion in a circumferential direction of an end portion of the first path restricting member 40 in the lengthwise direction thereof. The receiving portion 53 covers a portion of the outer circumferential surface of the first path restricting member 40 in the circumferential direction of the first path restricting member 40. The receiving portion 53 has a semi-cylindrical horizontal cross-sectional shape as a whole. The receiving portion 53 has, for example, a semi-cylindrical shape with a diameter larger than that of the main body portion 51. The receiving portion 53 covers, for example, half of the outer circumference of the first path restricting member 40.

The lid portion 54 covers the entirety of an end portion of the first path restricting member 40 in the circumferential direction thereof, together with the receiving portion 53. Specifically, the lid portion 54 covers all the way around the outer circumferential surface of the end portion of the first path restricting member 40 in the circumferential direction thereof, together with the receiving portion 53. The lid portion 54 in the present embodiment covers a portion of the outer circumferential surface of the first path restricting member 40 and the portion of the outer circumferential surface of the exterior member 30 exposed from the insertion port 40X.

The lid portion 54 has a semi-cylindrical horizontal cross-sectional shape as a whole. The lid portion 54 has a semi-cylindrical shape with the same diameter as the diameter of the receiving portion 53. The lid portion 54 covers a portion not covered by the receiving portion 53, of the outer circumferential surface of the first path restricting member 40 in the circumferential direction thereof, which corresponds to half of the range of the outer circumferential surface of the first path restricting member 40 in the circumferential direction thereof.

The lid portion 54 is, for example, a member separate from the receiving portion 53.

The receiving portion 53 is provided with first coupling portions 55. The first coupling portions 55 are respectively provided at two end portions of the receiving portion 53 in the circumferential direction thereof. The first coupling portions 55 respectively protrude from the two end portions of the receiving portion 53 in the circumferential direction thereof, outward in a radial direction of the receiving portion 53.

The lid portion 54 is provided with second coupling portions 56. The second coupling portions 56 are respectively provided at two end portions of the lid portion 54 in the circumferential direction thereof. The second coupling portions 56 are respectively provided with grooves 57 into which the first coupling portions 55 are inserted. The grooves 57 extend in the lengthwise direction of the second path restricting member 50. The second coupling portions 56 are configured to be attachable to the first coupling portions 55 by sliding in the lengthwise direction of the second path restricting member 50. As a result of the first coupling portions 55 and the second coupling portions 56 being coupled to each other, the receiving portion 53 and the lid portion 54 are held so as not to become detached from each other.

Configuration of Screw 60

As shown in FIG. 4, the second path restricting member 50 is provided with a screw 60 that serves as the pressing member (press) to be attached to the covering portion 52. The lid portion 54 in the present embodiment is provided with a fixing hole 58 to which the screw 60 is attached from the outer circumferential surface side of the covering portion 52. The fixing hole 58 penetrates through the covering portion 52 from the outer circumferential surface side to the inner circumferential surface side thereof. For example, the fixing hole 58 extends through the lid portion 54 in a radial direction of the covering portion 52. The fixing hole 58 is provided at a position corresponding to the insertion port 40X of the first path restricting member 40. That is to say, the fixing hole 58 faces the insertion port 40X in a radial direction of the covering portion 52. The inner circumferential surface of the fixing hole 58 is provided with an internal thread (not shown). The fixing hole 58 penetrates through the covering portion 52 from the outer circumferential surface side to the inner circumferential surface side thereof. Therefore, the screw 60 can be attached to the fixing hole 58 from the outer circumferential surface side of the covering portion 52 in a state where the receiving portion 53 and the lid portion 54 are assembled in an annular shape that covers the entirety of the wire harness main body 11 in the circumferential direction thereof.

The screw 60 is provided with an external thread portion 61 (external thread). The external thread portion 61 is provided with a helical thread on the outer peripheral surface thereof that has a cylinder or cone shape. The external thread portion 61 is screwed into the fixing hole 58 and is fixed thereto. The external thread portion 61 includes a fixed portion 62 that is fixed in the fixing hole 58, and a protruding portion 63 that protrudes from the fixed portion 62 toward the inner circumferential surface of the covering portion 52. The fixed portion 62 is a portion of the external thread portion 61 located inside the fixing hole 58.

The protruding portion 63 is a portion of the external thread portion 61 protruding from the fixing hole 58 toward the inner circumferential surface of the covering portion 52. The protruding portion 63 is inserted into the insertion port 40X of the first path restricting member 40. That is to say, the protruding portion 63 is located between the first end portion 41 and the second end portion 42 of the first path restricting member 40. As a result, the first end portion 41 and the second end portion 42 can engage with the protruding portion 63 in the circumferential direction thereof. The leading end portion of the protruding portion 63 is in contact with the outer circumferential surface of the exterior member 30 exposed from the insertion port 40X, to press the exterior member 30. Due to the pressure from the screw 60, the coupling portion 43 of the first path restricting member 40 is pressed against the inner circumferential surface of the receiving portion 53.

As shown in FIG. 2, the wire harness 10 is provided with a first slide restricting member 71 that is configured to restrict the first path restricting member 40 from sliding in the lengthwise direction of the exterior member 30, for example. Also, the wire harness 10 is provided with a second slide restricting member 72 that is configured to restrict the second path restricting member 50 from sliding in the lengthwise direction of the exterior member 30, for example. Resin or metal band ties, caulking rings, adhesive tapes, or the like may be used as the first slide restricting member 71 and the second slide restricting member 72, for example. The first slide restricting member 71 and the second slide restricting member 72 in the present embodiment are pieces of adhesive tape. The first slide restricting member 71 is wound around the end portion that is not coupled to the second path restricting member 50, of the first path restricting member 40, and the exterior member 30. The second slide restricting member 72 is wound around the end portion that is not coupled to the first path restricting member 40, of the second path restricting member 50, and the exterior member 30.

Next, effects of the present embodiment will be described.

(1) The second path restricting member 50 that serves as the attaching member (attachment) is provided with a covering portion 52 that covers the outer circumferential surface of the first path restricting member 40 and a screw 60 that serves as the pressing member that is attached to the covering portion 52. The covering portion 52 is provided with a fixing hole 58 that penetrates through the covering portion 52 from the outer circumferential surface side to the inner circumferential surface side thereof. The screw 60 is provided with a fixed portion 62 that is fixed in the fixing hole 58, and a protruding portion 63 that protrudes from the fixed portion 62 toward the inner circumferential surface of the covering portion 52. The protruding portion 63 is in contact with the wire harness main body 11 to press the wire harness main body 11 against the inner circumferential surface of the covering portion 52.

With this configuration, the wire harness main body 11 that extends inside the covering portion 52 is pressed by the screw 60 fixed to the fixing hole 58 of the covering portion 52, against the inner circumferential surface of the covering portion 52. As a result, the covering portion 52 and the wire harness main body 11 can be prevented from rattling. Note that, in the above-described embodiment, the receiving portion 53 and the lid portion 54 are moved away from each other as a result of the screw 60 pressing the wire harness main body 11 against the inner circumferential surface of the covering portion 52. As a result, rattling is prevented from occurring between the first coupling portions 55 of the receiving portion 53 and the grooves 57 of the lid portion 54. As a result, for example, it is possible to prevent the attaching portion between the first path restricting member 40 and the second path restricting member 50 from being damaged, and accordingly it is possible to reliably restrict the path of the wire harness main body 11.

(2) The protruding portion 63 is inserted into the insertion port 40X. The protruding portion 63 is in contact with the outer circumferential surface of the exterior member 30 to press the exterior member 30.

With this configuration, the protruding portion 63 that is in contact with the exterior member 30 can press the exterior member 30 and the first path restricting member 40 against the inner circumferential surface of the covering portion 52. Also, the protruding portion 63 is inserted into the insertion port 40X of the first path restricting member 40. Therefore, the first end portion 41 and the second end portion 42 of the first path restricting member 40 that define the insertion port 40X can engage with the protruding portion 63 in the circumferential direction thereof. Therefore, it is possible to prevent the first path restricting member 40 from rotating in the circumferential direction thereof, using the protruding portion 63.

(3) The pressing member that presses the wire harness main body 11 is a screw 60 that is provided with an external thread portion 61 that is screwed into the fixing hole 58. A portion of the external thread portion 61 constitutes the protruding portion 63.

With this configuration, it is possible to realize a pressing member that presses the wire harness main body 11, by performing a simple operation to screw the screw 60 into the fixing hole 58 until the leading end of the external thread portion 61 abuts against the wire harness main body 11.

(4) The second path restricting member 50 includes a main body portion 51 that is configured to restrict the path of the exterior member 30, and a receiving portion 53 that is provided at an end portion of the main body portion 51 in the lengthwise direction of the wire harness main body 11. The second path restricting member 50 is provided with a lid portion 54 that covers the entirety of the first path restricting member 40 in the circumferential direction thereof, together with the receiving portion 53. The receiving portion 53 and the lid portion 54 constitute the covering portion 52. With this configuration, the covering portion 52 that covers the outer circumferential surface of the first path restricting member 40 can be constituted by the receiving portion 53 and the lid portion 54.

(5) The fixing hole 58 is provided in the lid portion 54. With this configuration, the screw 60 can be attached to the fixing hole 58 provided in the lid portion 54.

(6) The attaching member attached to the first path restricting member 40 is the second path restricting member 50 attached to the outer circumferential surface of the exterior member 30 and is configured to restrict the path of the exterior member 30. The covering portion 52 is provided at an end portion of the second path restricting member 50 in the lengthwise direction thereof and covers the outer circumferential surface of an end portion of the first path restricting member 40 in the lengthwise direction thereof. Therefore, the first path restricting member 40 and the second path restricting member 50 are coupled to each other in the lengthwise direction thereof. Therefore, the path of the exterior member 30 is continuously restricted by the first path restricting member 40 and the second path restricting member 50.

(7) The first path restricting member 40 restricts the path of the straight section 11A, which is a straight section of the path of the wire harness main body 11. The second path restricting member 50 restricts the path of the bent section 11B, which is a bent section of the path of the wire harness main body 11. As a result, the path of the straight section 11A and the path of the bent section 11B of the wire harness main body 11 are continuously restricted from deviating from the respective desired paths thereof.

The present embodiment can be modified and implemented as follows. The present embodiment and the following modifications can be implemented in combination with each other as long as no contradiction arises.

In the above-described embodiment, the fixing hole 58 is formed so as to face the insertion port 40X of the first path restricting member 40 in a radial direction thereof. However, the present disclosure is not limited to such a configuration. The fixing hole 58 may be provided so as to face the outer circumferential surface of the coupling portion 43 of the first path restricting member 40 in a radial direction thereof.

In the covering portion 52 in the above-described embodiment, the fixing hole 58 is provided in the lid portion 54. However, the present disclosure is not limited to such a configuration, and the fixing hole 58 may be provided in the receiving portion 53.

In the above-described embodiment, the screw 60 is used as the pressing member that presses the wire harness main body 11. However, the present disclosure is not specifically limited to this configuration. The configuration of the pressing may be changed as appropriate.

Figure 5:
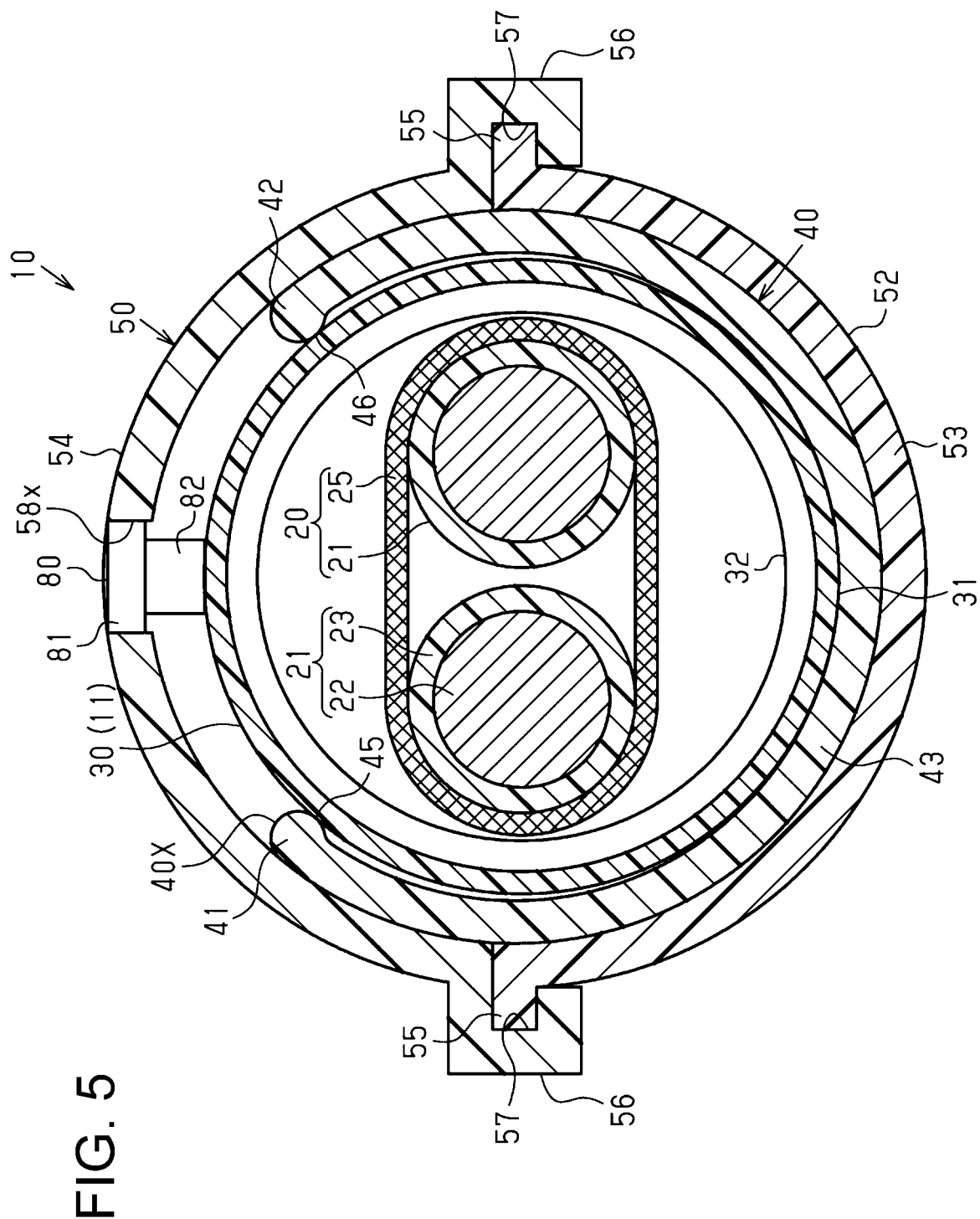
FIG. 5 is a schematic horizontal cross-sectional view showing a wire harness according to a modified example.

For example, in the configuration shown in FIG. 5, a pin-shaped member that is not a screw is used as a pressing member 80 that presses the wire harness main body 11. The pressing member 80 includes a fixed portion 81 that is fixed in a fixing hole 58x that is formed in the covering portion 52, and a protruding portion 82 that protrudes from the fixed portion 81 toward the inner circumferential surface of the covering portion 52. The fixed portion 81 has the same shape as the fixing hole 58x when viewed in the direction in which the fixing hole 58x extends. The fixed portion 81 is press-fitted into the fixing hole 58x and is fixed thereto. Note that the shape of the fixing hole 58x and the fixed portion 81 when viewed in the direction in which the fixing hole 58x extends is, for example, a circular shape, an ellipsoidal shape, a polygonal shape, or the like.

The protruding portion 82 is in contact with the wire harness main body 11 to press the wire harness main body 11 against the inner circumferential surface of the covering portion 52. Specifically, the protruding portion 82 is inserted into the insertion port 40X. The protruding portion 82 is in contact with the outer circumferential surface of the exterior member 30 to press the exterior member 30. Due to the pressure of the screw 60, the coupling portion 43 of the first path restricting member 40 is pressed against the inner circumferential surface of the receiving portion 53.

Even with such a configuration, it is possible to achieve effects similar to the effects of the above-described embodiment. In addition, with the configuration shown in FIG. 5, the pressing member 80 is provided with the fixed portion 81 that is press-fitted into the fixing hole 58x and is fixed thereto. Therefore, it is possible to press the wire harness main body 11 against the covering portion 52 using the pressing member 80 by performing a simple operation to press-fit the fixed portion 81 into the fixing hole 58x.

The protruding portion 63 of the screw 60 in the above-described embodiment is inserted into the insertion port 40X of the first path restricting member 40 and comes into contact with the outer circumferential surface of the exterior member 30. However, the present disclosure is not specifically limited to such a configuration, and it is possible to employ a configuration in which the protruding portion 63 comes into contact with the outer circumferential surface of the first path restricting member 40.

Figure 6:
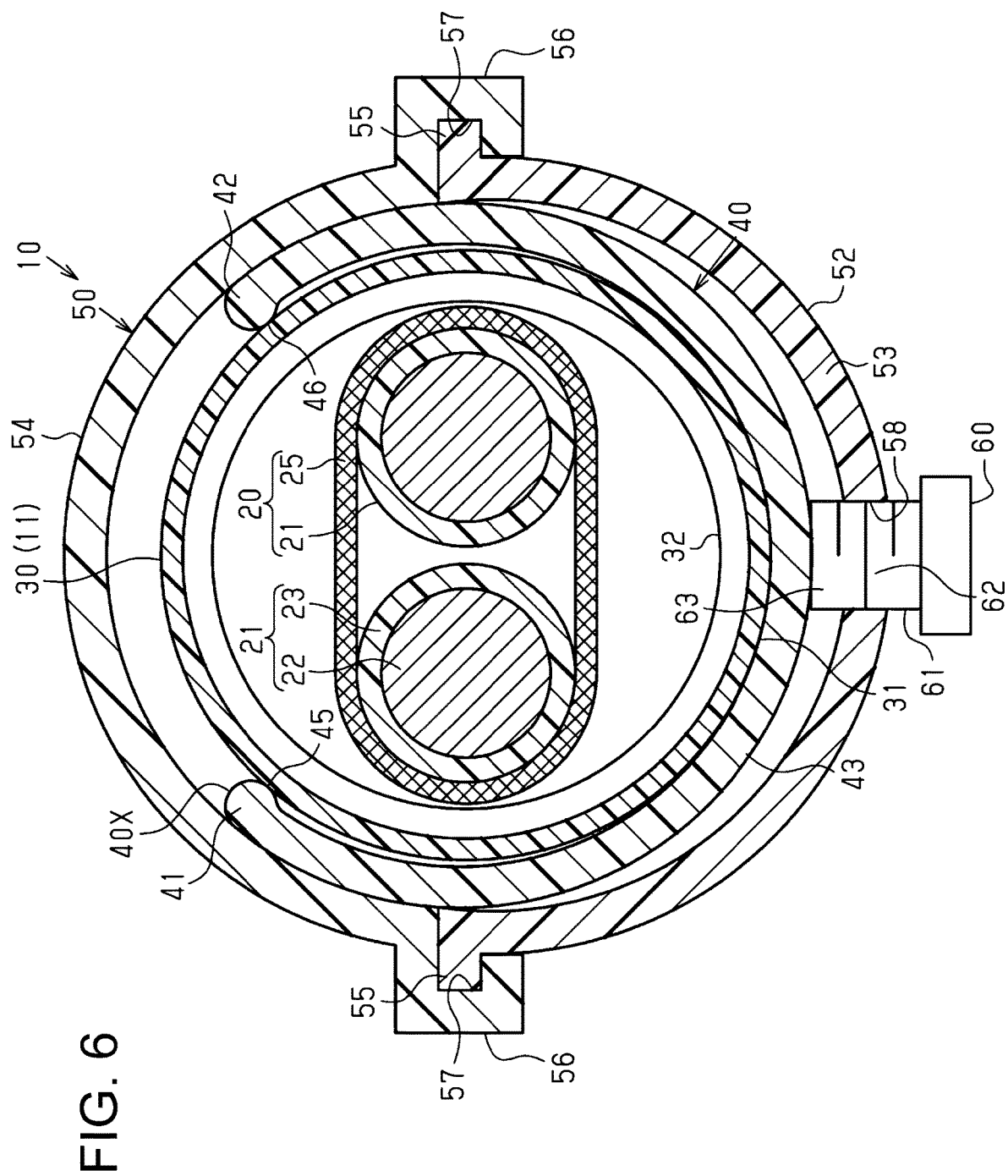
FIG. 6 is a schematic horizontal cross-sectional view showing a wire harness according to a modified example.

For example, in the configuration shown in FIG. 6, the fixing hole 58 is provided in the receiving portion 53 of the covering portion 52. The fixing hole 58 is located outward of the coupling portion 43 of the first path restricting member 40 in a radial direction thereof. That is to say, the fixing hole 58 faces the coupling portion 43 in a radial direction thereof. In the screw 60 screwed into the fixing hole 58, the protruding portion 63, which is a portion that includes the leading end of the external thread portion 61, is in contact with the outer circumferential surface of the coupling portion 43 of the first path restricting member 40 to press the coupling portion 43.

With this configuration, the protruding portion 63 that is in contact with the first path restricting member 40 can press the first path restricting member 40 against the inner circumferential surface of the covering portion 52. That is to say, even with such a configuration, the wire harness main body 11 is pressed by the screw 60 against the inner circumferential surface of the covering portion 52. As a result, the covering portion 52 and the wire harness main body 11 can be prevented from rattling. Note that, in the configuration shown in FIG. 6, the screw 60 and the fixing hole 58 can be replaced with the pressing member 80 and the fixing hole 58x in the configuration shown in FIG. 5.

In the covering portion 52 in the above-described embodiment, one fixing hole 58 is provided. However, the present disclosure is not specifically limited to such a configuration, and a plurality of fixing holes 58 may be provided in the covering portion 52.

Figure 7:
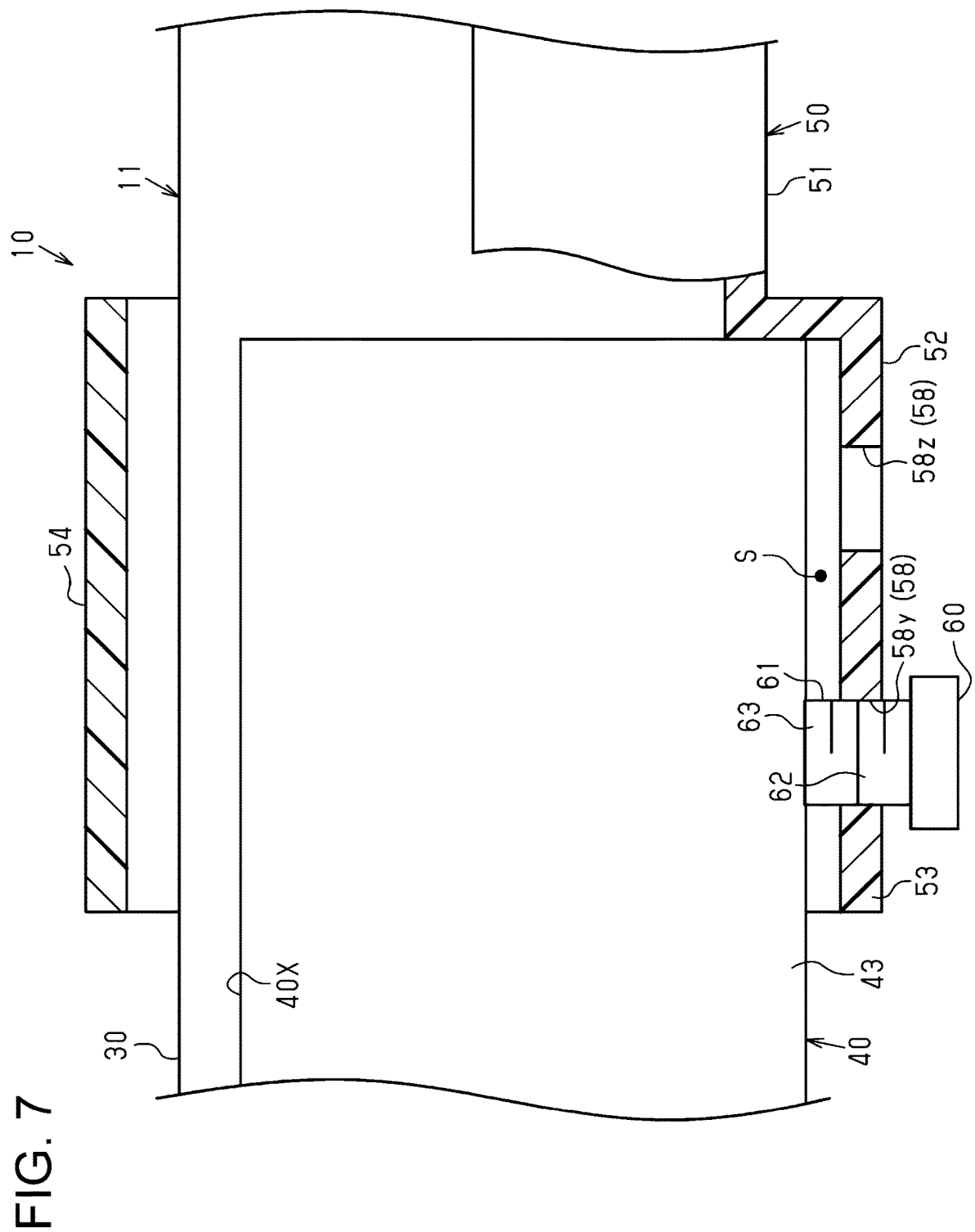
FIG. 7 is a schematic cross-sectional view showing a wire harness according to a modified example.

For example, in the configuration shown in FIG. 7, a plurality of fixing holes 58 are provided in the receiving portion 53. The plurality of fixing holes 58 are line up along the lengthwise direction of the wire harness main body 11, for example. Note that, in FIG. 7, the surface shape of the exterior member 30 is simplified in order to simplify the drawing.

The screw 60 is attached to at least one fixing hole 58y of the plurality of fixing holes 58. At least one fixing hole 58 to which the screw 60 is not attached of the plurality of fixing holes 58 is an open fixing hole 58z that is in an open state. In the example shown in FIG. 7, two fixing holes 58 are provided, one of which is a fixing hole 58y and the other one is an open fixing hole 58z. However, the number of fixing holes 58y and the number of open fixing holes 58z may be changed as appropriate. Although the open fixing hole 58z is a hole to which a screw 60 is not attached, the open fixing hole 58z is the same hole as the fixing hole 58y and a screw 60 can be screwed thereinto.

In the screw 60 screwed into the fixing hole 58y, the protruding portion 63, which is a portion that includes the leading end of the external thread portion 61, is in contact with the outer circumferential surface of the coupling portion 43 of the first path restricting member 40 to press the coupling portion 43, as with the configuration shown in FIG. 6. Thus, the first path restricting member 40 is pressed against the inner circumferential surface of the covering portion 52.

With this configuration, fixing holes 58 to which screws 60 are to be attached can be selected from among a plurality of fixing holes 58. As a result, flexibility in attaching screws 60 is improved. Also, water that has entered between the covering portion 52 and the wire harness main body 11 can be discharged to the outside of the covering portion 52 through the open fixing hole 58z. In the configuration shown in FIG. 7, a clearance S is formed between the outer circumferential surface of the coupling portion 43 and the inner circumferential surface of the covering portion 52 as a result of the screw 60 pressing the outer circumferential surface of the coupling portion 43. Water that has entered the clearance S can be discharged to the outside of the covering portion 52 through the open fixing hole 58z.

Note that, in the configuration shown in FIG. 7, the screw 60 and each fixing hole 58 can be replaced with the pressing member 80 and the fixing hole 58x in the configuration shown in FIG. 5. Also, the arrangement of the plurality of fixing holes 58 is not limited to the configuration described above, and the plurality of fixing holes 58 may be arranged side by side in the circumferential direction of the wire harness main body 11, for example. Also, although a plurality of fixing holes 58 are provided in the receiving portion 53 in the example shown in FIG. 7, the present disclosure is not limited to such a configuration, and a plurality of fixing holes 58 may be provided in the lid portion 54. Alternatively, a fixing hole 58 may be provided in both the receiving portion 53 and the lid portion 54.

In the above-described embodiment, the covering portion 52 includes the receiving portion 53 and the lid portion 54. However, the present disclosure is not limited to such a configuration, and the configuration may be changed to a configuration in which the covering portion 52 has a tubular shape that cannot be disassembled or deformed.

Also, although the lid portion 54 in the above-described embodiment is a member separate from the receiving portion 53, the present disclosure is not specifically limited to such a configuration, and the lid portion 54 may be formed integrally with the receiving portion 53.

Figure 8:
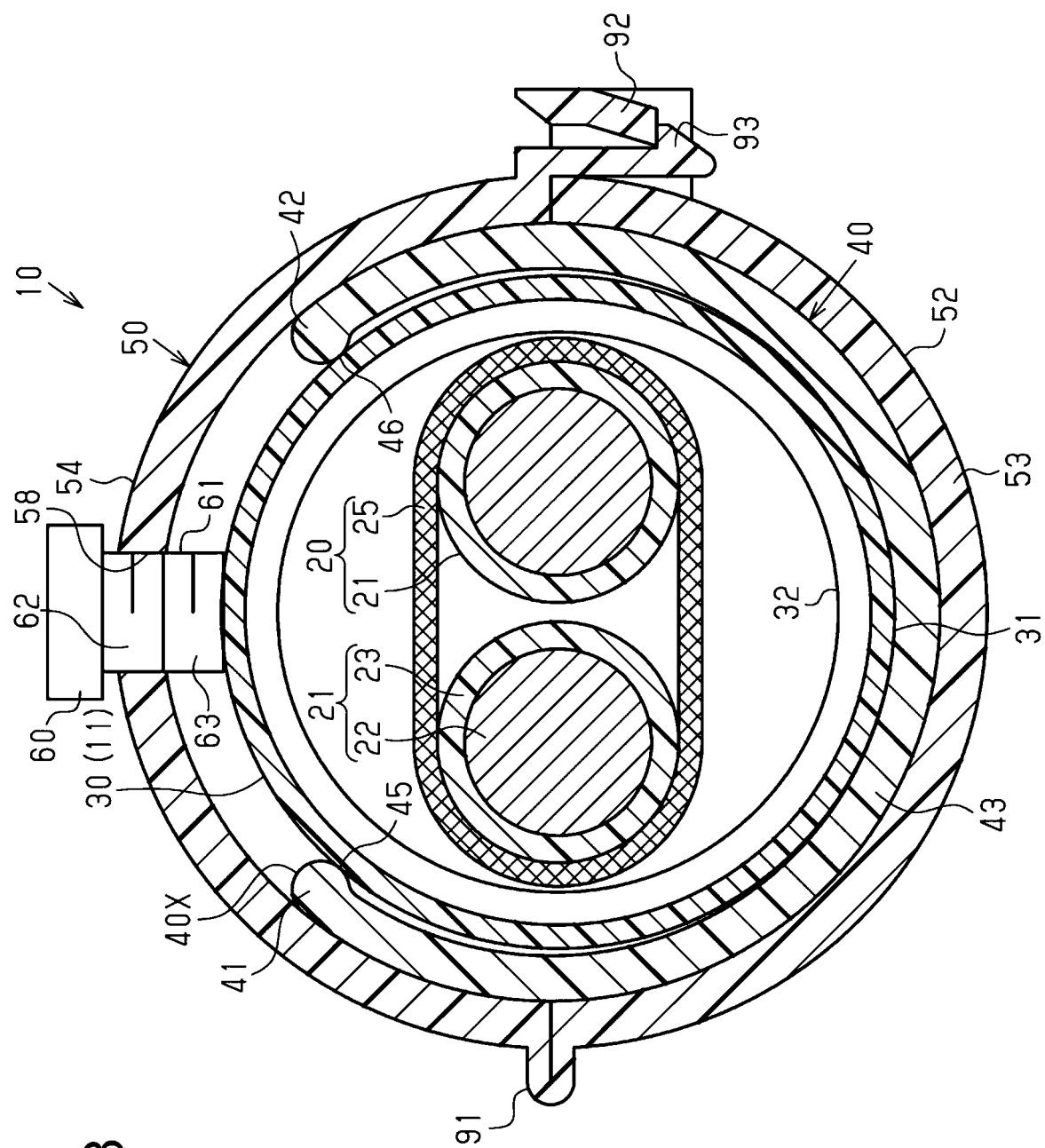
FIG. 8 is a schematic horizontal cross-sectional view showing a wire harness according to a modified example.

For example, in the configuration shown in FIG. 8, the lid portion 54 formed integrally with the receiving portion 53 with a thin hinge portion 91 being interposed therebetween. That is to say, the receiving portion 53 and the lid portion 54 are connected to each other by the hinge portion 91. The hinge portion 91 connects an end portion of the receiving portion 53 in the circumferential direction thereof and an end portion of the lid portion 54 in the circumferential direction thereof. The other end portion of the receiving portion 53 in the circumferential direction thereof is provided with a lock portion 92. The other end portion of the lid portion 54 in the circumferential direction thereof is provided with a claw portion 93.

The lid portion 54 is rotatable about the hinge portion 91 between the open position and the closed position shown in FIG. 8. When the lid portion 54 is in the closed position, the claw portion 93 is hooked on the lock portion 92. As a result, the lid portion 54 is held in the closed position. Thus, the receiving portion 53 and the lid portion 54 are coupled to each other. In a state where the receiving portion 53 and the lid portion 54 are coupled to each other, the covering portion 52 has an annular shape that surrounds the outer circumferential surfaces of the end portions of the exterior member 30 and the first path restricting member 40 together. Even when the covering portion 52 has the configuration shown in FIG. 8, the pressure from the screw 60 can prevent rattling from occurring between the covering portion 52 and the wire harness main body 11.

In addition, with the configuration as described above, rattling occurs between the receiving portion 53 and the lid portion 54 due to the clearance between the thin hinge portion 91 and the claw portion 93, and, as a result, it is more likely that rattling occurs between the covering portion 52 and the first path restricting member 40. Therefore, by providing the screw 60 in the above configuration, it is possible to make the effect of the screw 60 of preventing rattling more remarkable. Note that, in the configuration shown in FIG. 8, the screw 60 and the fixing hole 58 can be replaced with the pressing member 80 and the fixing hole 58x in the configuration shown in FIG. 5.

The direction in which the fixing hole 58 extends is not limited to being a radial direction of the covering portion 52. The direction in which the fixing hole 58 extends is not limited to being a radial direction of the covering portion 52 as long as the fixing hole 58 extends from the outer circumferential surface side to the inner circumferential surface of the covering portion 52.

In the covering portion 52 in the above-described embodiment, the recess-protrusion relationship of the first coupling portions 55 and the second coupling portions 56 may be the other way around. That is to say, it is possible to employ a configuration in which the second coupling portions 56 are inserted into grooves provided in the first coupling portions 55.

The second path restricting member 50 in the above-described embodiment is formed so as to restrict the path of the bent section 11B of the wire harness main body 11. However, the present disclosure is not limited to such a configuration. For example, the shape of the second path restricting member 50 may be changed so as to restrict the path of the straight section 11A of the wire harness main body 11. In the second path restricting member 50 in this case, for example, the bent shape in the main body portion 51 is changed to a straight shape.

In the above-described embodiment, an attaching member attached to the first path restricting member 40 is embodied as the second path restricting member 50. However, the present disclosure is not limited to such a configuration. For example, the attaching member may be embodied as a vehicle attaching member that is used to attach the first path restricting member 40 to the vehicle V.

The structure of the first path restricting member 40 in the above-described embodiment may be changed as appropriate. For example, as long as the first path restricting member 40 has the insertion port 40X and is configured to be attachable to the outer circumferential surface of the exterior member 30, other configurations are not specifically limited.

The protruding portion 45 in the above-described embodiment may be provided further away from the insertion port 40X than the leading end of the first end portion 41 in the circumferential direction of the first path restricting member 40.

The protruding portion 46 in the above-described embodiment may be provided further away from the insertion port 40X than the leading end of the second end portion 42 in the circumferential direction of the first path restricting member 40.

The protruding portions 45 and 46 in the above-described embodiment may be provided on a portion of the first path restricting member 40 in the lengthwise direction thereof.

At least either one of the protruding portions 45 and 46 in the above-described embodiment may be omitted.

The shape of the coupling portion 43 of the first path restricting member 40 in the above-described embodiment is not limited to an arc shape, and may be changed to an ellipsoidal arc shape, a U shape, or the like, for example.

In the above-described embodiment, the first path restricting member 40 and the second path restricting member 50 are more rigid than the exterior member 30. However, the present disclosure is not limited to such a configuration, and the first path restricting member 40 and the second path restricting member 50 may be as rigid as the exterior member 30, or less rigid than the exterior member 30. That is to say, it is only necessary that the first path restricting member 40 and the second path restricting member 50 make the wire harness main body 11 less bendable than when the first path restricting member 40 and the second path restricting member 50 are not attached to the wire harness main body 11.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with a large-diameter portions 31 or small-diameter portions 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments and modified examples disclosed herein are illustrative in all aspects and the present disclosure is not limited to these examples. That is to say, the scope of the present disclosure is indicated by the scope of claims, and is intended to include all modifications within the meaning and scope equivalent to the scope of claims.

What is claimed is:
1. A wire harness comprising:
a wire harness main body that includes (1) an electric wire, (2) an exterior tube that covers an outer circumferential surface of the electric wire, and (3) a first path restrictor that (i) is attached to an outer circumferential surface of the exterior tube, (ii) extends more than half way around the outer circumferential surface of the exterior tube in a circumferential direction, and (iii) is configured to restrict a path of the exterior tube; and
an attachment that is attached to an outer circumferential surface of a portion of the first path restrictor in a lengthwise direction thereof, wherein:
the first path restrictor is provided with an insertion port that is open in a direction orthogonal to the lengthwise direction of the first path restrictor, and extends over an entirety of the first path restrictor in the lengthwise direction thereof,
the attachment includes a cover that covers the outer circumferential surface of the first path restrictor, and a press that is attached to the cover,
the cover is provided with at least one fixing hole that penetrates through the cover from an outer circumferential surface side to an inner circumferential surface side thereof,
the press is provided with a fixed portion that is fixed in the at least one fixing hole, and a protrusion that protrudes from the fixed portion toward an inner circumferential surface of the cover, and
the protrusion is configured to come into contact with the wire harness main body and press the wire harness main body against the inner circumferential surface of the cover,
wherein the protrusion is in contact with the outer circumferential surface of the first path restrictor to press the first path restrictor.
2. The wire harness according to claim 1, wherein:
the press is a screw that is provided with an external thread that is screwed into the at least one fixing hole, and
a portion of the external thread forms the protrusion.

3. The wire harness according to claim 1, wherein the fixed portion is press-fitted into the at least one fixing hole and is fixed thereto.

4. The wire harness according to claim 1, wherein:
the cover comprises a plurality of fixing holes,
the press is attached to at least one fixing hole of the plurality of fixing holes, and
at least one fixing hole of the plurality of fixing holes is an open fixing hole to which the press is not attached and that is in an open state.

5. The wire harness according to claim 1, wherein:
the attachment includes a main body that is configured to restrict the path of the exterior tube, a receiver that is provided at an end of the main body in a lengthwise direction of the wire harness main body, and a lid that covers an entirety of the first path restrictor in a circumferential direction thereof, together with the receiver, and
the receiver and the lid form the cover.

6. The wire harness according to claim 5, wherein the at least one fixing hole is provided in the lid.

7. The wire harness according to claim 1, wherein:
the attachment is a second path restrictor that is attached to the outer circumferential surface of the exterior tube and is configured to restrict the path of the exterior tube, and
the cover is provided at an end of the second path restrictor in a lengthwise direction thereof, and covers an outer circumferential surface of an end of the first path restrictor in the lengthwise direction thereof.

8. The wire harness according to claim 7, wherein:
the first path restrictor is configured to restrict a path of a straight section that is included in the path of the wire harness main body, and
the second path restrictor is configured to restrict a path of a bend that is included in the path of the wire harness main body.

9. The wire harness according to claim 1, wherein the first path restrictor includes at least one protruding portion configured to protrude toward and come into contact with the outer circumferential surface of the exterior tube.

* * * * *